S. Bowman.
Grain Drill.

N° 86,364.      Patented Feb. 2, 1869.

Witnesses:
J. C. Smith
G. A. Hosmer

Inventor:
Samuel Bowman
Chipman Hosmer & C°
Att'ys.

UNITED STATES PATENT OFFICE.

SAMUEL BOWMAN, OF CAMP HILL, PENNSYLVANIA.

*Letters Patent No. 86,354, dated February 2, 1869.*

IMPROVEMENT IN GRAIN-DRILL ATTACHMENT.

The Schedule referred to in these Letters Patent and making part of the same.

*To all whom it may concern:*

Be it known that I, SAMUEL BOWMAN, of Camp Hill, in the county of Cumberland, and State of Pennsylvania, have invented a new and valuable Improvement in Broadcast Sowing by Attachment to all Grain-Drills; and I do hereby declare that the following is a full, clear, and exact description of the construction and operation of the same, reference being had to the annexed drawings, making a part of this specification, and to the letters and figures of reference marked thereon.

Figure 1, of the drawings, is a plan view of my seed-sower;

Figure 4, details.

My invention relates to that class of seed-sowers in which the seed passes downward through the oscillating bottom of the hopper, and through suitable conduits to the ground, and is covered by proper plows attached to the machine, and working by the same power.

My object is to provide, for farmers' use, a more perfect and suitable device, of the character named, than has heretofore been invented.

My seed-sower is constructed in the usual sulky-form, of which—

A represents the wheels;

B, the axle;

C, a cogged wheel attached to the axle;

D, a shaft adjusted upon the frame in front of the axle; and

Y, a pinion attached to said shaft, working with the cog-wheel C, in the manner shown.

The shaft D, inside the pinion, is constructed in the form of a crank, or cam, and letter $a$ is an arm attached thereto, and connected and operating as hereinafter mentioned.

The letter E is the seed-box, or hopper, constructed with apertures in its bottom, immediately below the plates $c$.

The letter F is an oscillating plate adjusted in the bottom of the hopper, connected and operating as hereinafter described.

Letters G are tubes, or conduits, leading from the apertures in the seed-box above mentioned, toward the ground.

Letters H are arms hinged to the front cross-bar of the frame, and extending rearward, to form connection with the coverers.

It will be observed that these arms H are not of equal length, but increase in length from the right to the left of the carriage. The object of this divergence is to adjust the plows or coverers in a diagonal position, as shown in fig. 3.

The letters P are the coverers severally adjusted to the rear ends of arms H, as represented, and connected with the swinging bar $d$ by means of suitable cords or chains marked $g$.

The swinging bar $d$ is hinged to the side pieces of the frame. It has a hook, $h$, that operates with the hook $i$ on the rear of the seed-box, and the two, when united, serve to hold the swinging bar, and the coverers connected therewith, above the ground, when desirable so to do.

Figure 3:
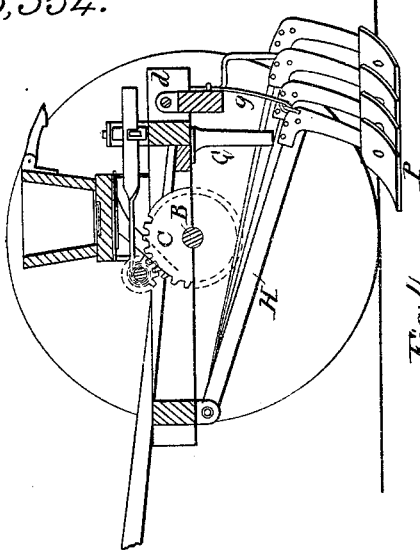
Figure 3 is a section.
Figure 4:
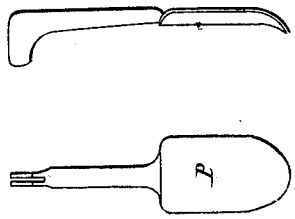
Figure 2:
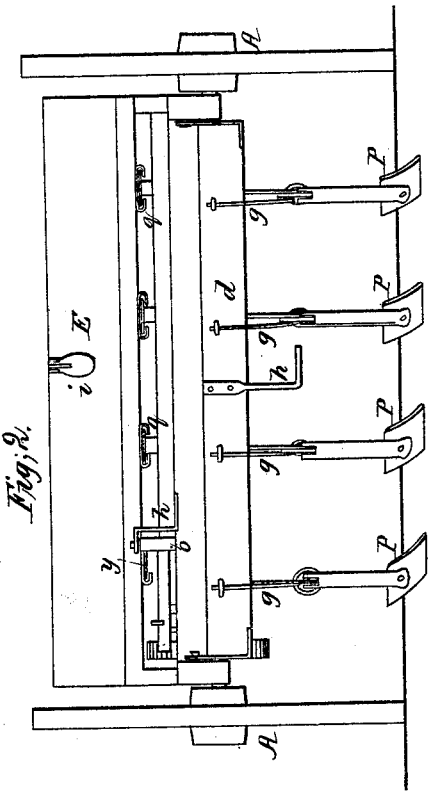
Figure 2 is a rear view.
Figure 1:
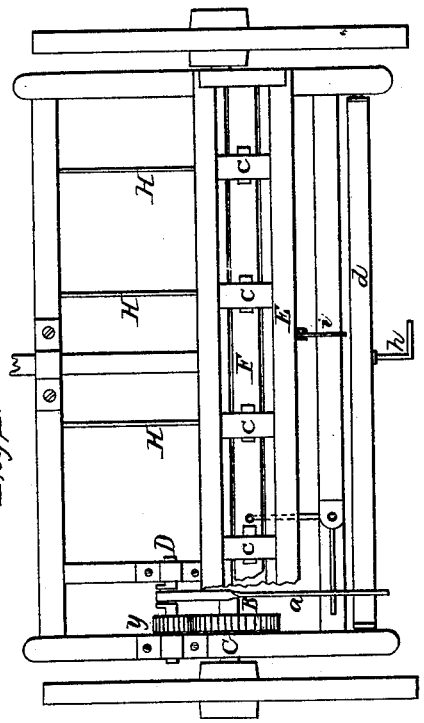

The upper ends of the beams of the coverers are constructed in a hooked form, as shown on fig. 3, and with slots, as shown on fig. 2. They are also provided with pin-holes, as represented.

The rear ends of arms H respectively enter the slots of the beams, and a wooden pin is passed through a pin-hole in the beam, and rests upon the top of said arm H.

The object of the above-named arrangement is to prevent accidents to the plows, beams, or other portions of the sower, which frequently occur when the plow-beams are attached to the sower rigidly and firmly.

Whenever my device is used, and wooden or brittle metallic pins are used, as indicated, breakage to the parts, when the plows encounter roots or firmly-bedded rocks, will seldom if ever occur. In such case the pins will break, and allow the plows to be drawn out rearward.

The letter $o$ is a pivot-post, to which is attached an arm, $p$, connected, as shown, with plate F, and also an arm, $y$, connected with the arm $a$ whenever desirable, by passing into a notch cut therein, as shown on fig. 3.

The cog-wheel C, pinion E, arms $a$ and $p$, working in combination, serve to move the plate F back and forth in the bottom of the seed-box, above the holes therein, letting the seed on and shutting it off from the conduits at each movement.

What I claim as my invention, and desire to secure by Letters Patent, is—

A seed-sower having cog-wheels C, pinion $y$, shaft D, arms $a$, H, $y$, and $p$, pivot-post $o$, plate F, cord $g$, swinging bar $d$, hooks $h$ and $i$, coverers $p$, and plow-beams and brittle pins, as described, constructed, arranged, and operating substantially as specified.

In testimony that I claim the above, I have hereunto subscribed my name, in the presence of two witnesses.

SAMUEL BOWMAN.

Witnesses:
ROBT. SNODGRASS,
C. A. SNYDER.